(12) United States Patent
Phillips et al.

(10) Patent No.: US 8,710,368 B2
(45) Date of Patent: Apr. 29, 2014

(54) ADJUSTABLE BOX EXTENDER

(71) Applicants: Bruce G. Phillips, Gilbert, AZ (US); Guy Hansen, Villa Park, CA (US)

(72) Inventors: Bruce G. Phillips, Gilbert, AZ (US); Guy Hansen, Villa Park, CA (US)

( * ) Notice: Subject to any disclaimer, the term of this patent is extended or adjusted under 35 U.S.C. 154(b) by 0 days.

(21) Appl. No.: 13/852,618

(22) Filed: Mar. 28, 2013

(65) Prior Publication Data

US 2013/0256026 A1   Oct. 3, 2013

Related U.S. Application Data

(60) Provisional application No. 61/616,976, filed on Mar. 28, 2012.

(51) Int. Cl.
| | |
|---|---|
| *H01H 9/02* | (2006.01) |
| *H01H 13/04* | (2006.01) |
| *H01H 19/04* | (2006.01) |
| *H01H 21/04* | (2006.01) |
| *H01H 23/04* | (2006.01) |
| *H01R 13/46* | (2006.01) |
| *H01J 5/00* | (2006.01) |
| *H01J 15/00* | (2006.01) |
| *H02G 5/00* | (2006.01) |
| *H05K 5/00* | (2006.01) |
| *H02G 3/08* | (2006.01) |
| *H02G 3/12* | (2006.01) |
| *H02G 3/18* | (2006.01) |

(52) U.S. Cl.
CPC .............. *H02G 3/086* (2013.01); *H02G 3/123* (2013.01); *H02G 3/121* (2013.01); *H02G 3/18* (2013.01)
USPC ................... 174/57; 174/58; 174/53; 174/50; 174/520

(58) Field of Classification Search
CPC ........... H01L 2924/01079; H01L 2924/15311; H01L 2224/16; H01L 2224/48091; H01L 2924/01078; H01L 2924/01013; H05K 3/301; H04B 1/08; H02G 3/088; H02G 3/081; H02G 3/14; H02G 3/086; H02G 3/123; H02G 3/18; H02G 3/121; H01R 25/006
USPC .......................... 174/535, 520, 50, 53, 57, 58; 361/679.01–679.61, 737, 752, 753, 361/796–812; 257/666–738; 455/575.1–575.9; 454/184; 220/3.2, 220/3.7, 4.03
See application file for complete search history.

(56) References Cited

U.S. PATENT DOCUMENTS

| 5,293,003 A | 3/1994 | Prairie, Jr. | |
|---|---|---|---|
| 5,736,674 A | 4/1998 | Gretz | |
| 5,931,325 A * | 8/1999 | Filipov | ......................... 220/3.7 |

(Continued)

*Primary Examiner* — Jenny L Wagner
*Assistant Examiner* — Ahmad D Barnes
(74) *Attorney, Agent, or Firm* — Kenneth L. Green

(57) ABSTRACT

An adjustable box extender allows an electrical device to be aligned with a dry wall face. The adjustable box extender includes a fixed ring attached to an electrical box and an adjustable ring adjustably attached to the fixed ring. The adjustable ring includes rectangular top and bottom open back pockets. Rectangular blocks reside inside each pocket. Adjusting screws are held by the adjustable ring with screw heads exposed on the face of the adjustable ring, neither advancing nor retreating with respect to the adjustable ring, and free to rotate with respect to the adjustable ring. The screws engage threads in the blocks and advance and retreat the block out of and into the pockets when the screws are turned, thereby extending the adjustable ring away from the fixed ring to adjust for dry wall thickness. Electrical device screws sandwich the adjustable ring between the electrical device and the fixed ring.

13 Claims, 4 Drawing Sheets

(56) References Cited

U.S. PATENT DOCUMENTS

| | | |
|---|---|---|
| 5,959,246 A | 9/1999 | Gretz |
| 6,307,154 B1 | 10/2001 | Gretz |
| 6,953,894 B2 | 10/2005 | Ungerman et al. |
| 7,077,280 B1 | 7/2006 | Gretz |
| 7,189,928 B2 | 3/2007 | Denier |
| 7,235,739 B2 | 6/2007 | King, Jr. et al. |
| 7,273,982 B1 | 9/2007 | Lalancette |
| 7,350,659 B1 | 4/2008 | Gretz |
| 7,531,743 B2 * | 5/2009 | Johnson et al. .......... 174/57 |
| 2003/0189043 A1 | 10/2003 | Wegner et al. |
| 2006/0207781 A1 | 9/2006 | Denier |
| 2007/0107924 A1 | 5/2007 | King, Jr. et al. |
| 2010/0084184 A1 * | 4/2010 | Phillips ................ 174/535 |

\* cited by examiner

US 8,710,368 B2

ADJUSTABLE BOX EXTENDER

The present application claims the priority of U.S. patent application Ser. No. 61/616,976 filed Mar. 28, 2012, which application is incorporated in its entirety herein by reference.

BACKGROUND OF THE INVENTION

The present invention relates to electrical box mounting behind drywall or any wall type, e.g., plywood and in particular to an adjustable depth box extender for electrical boxes.

Drywall is generally accepted as an interior wall material. The drywall may be attached to wood or metal frame structures and is available in various thicknesses. The electrical box is mounted behind the drywall and a mud ring is attached to the face of the electrical box and reaches through the dry wall. Electrical devices are attached to the face of the mud ring and are intended to line up with the face of the drywall. Complicating mud ring selection, there are a myriad of different wall configurations mandated by engineers to address structural, code and other design requirements.

Even if the electrical contracting professional installs the correctly sized mud ring for a specific application, e.g. ⅝" for one layer of ⅝" drywall, irregularities in wall construction, final finish (i.e. the addition of ceramic tile on the face of the drywall), and occasional damage to the bracket that secures the junction box will result in the face of the mud ring not being flush with the final face of the constructed wall.

Complicating matters further, sometimes the correctly sized mud ring is not commercially available for specified wall construction; for instance, major manufacturers do not produce a mud ring that is designed for a wall 1¾" thick.

Ensuring the mud ring is flush is not only an aesthetic concern, but more importantly an electrical code requirement: the National Electrical Code, Article 314.20 demands that the space from the face of the wall to the face of the mud ring not exceed ¼".

BRIEF SUMMARY OF THE INVENTION

The present invention addresses the above and other needs by providing an adjustable box extender which allows an electrical device to be aligned with a dry wall face. The adjustable box extender includes a fixed ring attached to an electrical box and an adjustable ring adjustably attached to the fixed ring. The adjustable ring includes rectangular top and bottom open back pockets. Rectangular blocks reside inside each pocket. Adjusting screws are held by the adjustable ring with screw heads exposed on the face of the adjustable ring, neither advancing nor retreating with respect to the adjustable ring, and free to rotate with respect to the adjustable ring. The screws engage threads in the blocks and advance and retreat the block out of and into the pockets when the screws are turned, thereby extending the adjustable ring away from the fixed ring to adjust for dry wall thickness. Electrical device screws sandwich the adjustable ring between the electrical device and the fixed ring.

In accordance with one aspect of the invention, there is provided adjustable box extender. The adjustable box extender includes a fixed ring having a mouth and attachable to an electrical box and an adjustable ring. The adjustable ring includes a face for mounting electrical devices, a throat opposite the face and slidable into the mouth of the fixed ring, and rear opening rectangular pockets at the top and bottom of the adjustable ring. Adjusting screws pass though the pockets and are held by the adjustable ring with the screw head exposed on the face of the adjustable ring, neither advancing nor retreating with respect to the adjustable ring, and are free to rotate with respect to the adjustable ring. Rectangular blocks are slidable into and out of the pockets and sandwiched between the adjustable ring and the fixed ring and having threads in the blocks threadably engagable by the adjusting screws and advance and retreat the block out of and into the pockets when the screws are turned, thereby extending the adjustable ring away from the fixed ring and drawing the adjustable ring away from the fixed ring to adjust for dry wall thickness.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
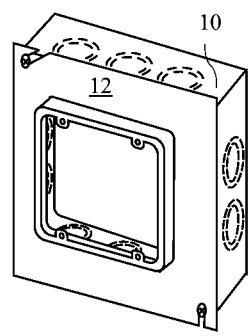
FIG. 1 is a perspective view of a prior art mud ring attached to an electrical box.
Figure 2A:
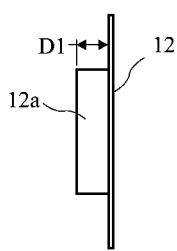
FIG. 2A is a side view of the prior art mud ring.
Figure 2B:
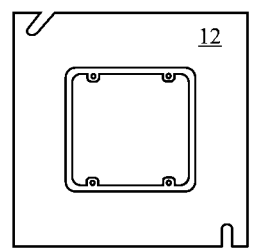
FIG. 2B is a front view of the prior art mud ring.

A perspective view of a prior art mud ring 12 attached to an electrical box 10 is shown in FIG. 1, a side view of the prior art mud ring 12 is shown in FIG. 2A, and a front view of the prior art mud ring 12 is shown in FIG. 2B. The mud ring 12 includes a portion 12a reaching forward to provide an electrical device mounting face even with the face of dry wall 11 (see FIG. 4C). The portion 12a reaches a fixed distance D1, and often does not align with the face of the drywall, requiring additional finishing work.

Figure 3:
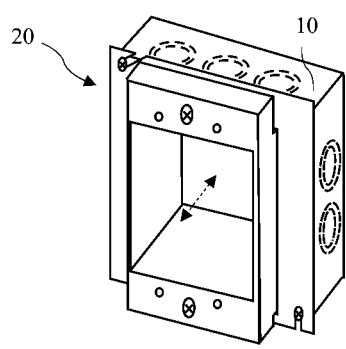
FIG. 3 is a perspective view of an adjustable box extender according to the present invention attached to the electrical box.
Figure 4D:
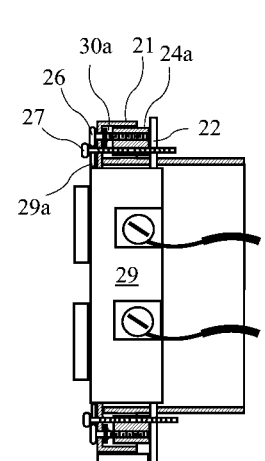
FIG. 4D is a cross-sectional view taken along line 4D-4D of FIG. 4B showing an electrical device attached to the adjustable box extender according to the present invention.
Figure 4A:
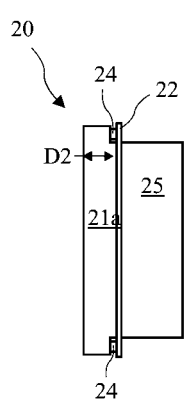
FIG. 4A is a side view of the adjustable box extender according to the present invention.
Figure 4B:
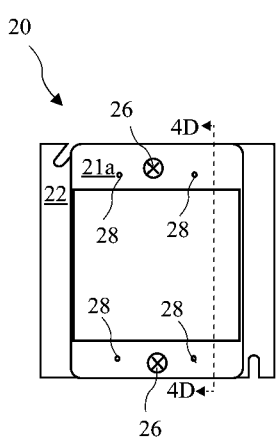
FIG. 4B is a front view of the adjustable box extender according to the present invention.

A perspective view of an adjustable box extender 20 according to the present invention attached to the electrical box 10 is shown in FIG. 3, a side view of the adjustable box extender 20 is shown in FIG. 4A, and a front view of the adjustable box extender 20 is shown in FIG. 4B. The adjustable box extender 20 comprises an adjustable ring 21 attaches to a flat (or sometimes shaped) fixed ring 22 and includes a throat 25 reaching adjustably through a ring mouth 23 (see FIG. 5) of the fixed ring 22. The adjustable ring 21 is advanced out of the fixed ring 22 and retreated into the fixed ring 22 to adjust the distance D2 by an adjusting screws 26 (see FIG. 9) which pass though the pockets and are held by the adjustable ring 21 with the screw head exposed on the face of the adjustable ring 21, neither advancing nor retreating with respect to the adjustable ring 21, and free to rotate with respect to the adjustable ring 21. The adjusting screws 26 are preferably machine screws with attached washers, commonly referred to a Screw and Washer Assemblies or SEMS.

Figure 11D:
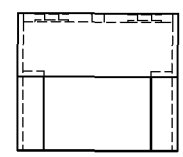
FIG. 11D is a top view of the one gang adjustable ring according to the present invention.
Figure 11A:
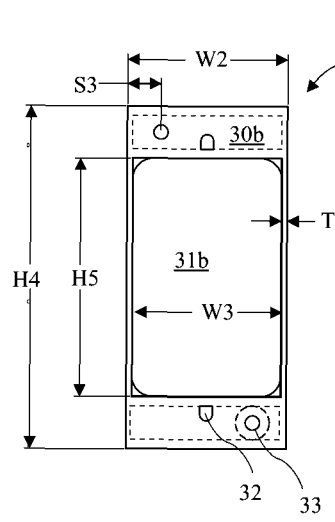
FIG. 11A is a front view of the one gang adjustable ring according to the present invention.

The adjusting screws 26 is preferably centered at the top and bottom of the adjustable ring for a two gang adjustable box extender, and is located proximal to opposites corner for a one gang adjustable box extender (see FIG. 11A).

Figure 4C:
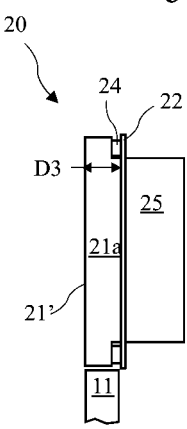
FIG. 4C is a second side view of the adjustable box extender according to the present invention with the adjustable box extender adjusted away from the fixed ring.

A second side view of the adjustable box extender 20 with the adjustable ring 21 adjusted away from the fixed ring 21a is shown in FIG. 4C and a cross-sectional view taken along line 4D-4D of FIG. 4B showing an electrical device 29 attached to the adjustable box extender 20 is shown in FIG. 4D by screws 27 through mounting flanges 29a of the electrical device 29. The adjusting screws 26 are turned to withdraw the adjusting screws 26 from the blocks 24a allowing the blocks 24a to move rearward out of pockets 30a (also see FIG. 6A and 6B) and allowing the face 21' of the adjustable ring 21 to separate from the fixed ring 21a to a distance D3. The electrical device 29 is attached to the fixed ring 21a with screws 27 passing through, but not engaging, the adjustable ring 21 and the blocks 24a, thereby sandwiching the adjustable ring 21 and the blocks 24a between the electrical device 29 and the fixed ring 22.

Figure 5:
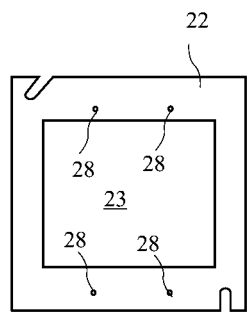
FIG. 5 is a front view of a fixed ring according to the present invention.

A front view of a fixed ring according 22 to the present invention is shown in FIG. 5. Threaded passages 28 in the fixed ring 22 receive standard electrical device mounting screws (not shown), and the mouth 23.

Figure 6A:
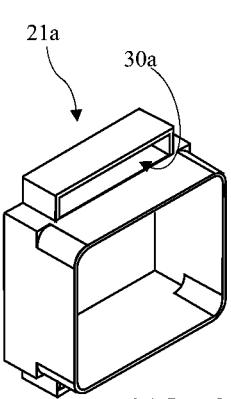
FIG. 6A is a perspective view of a two gang adjustable ring according to the present invention.
Figure 6B:
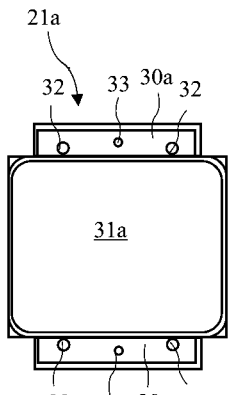
FIG. 6B is a rear view of the two gang adjustable ring according to the present invention.
Figure 7:
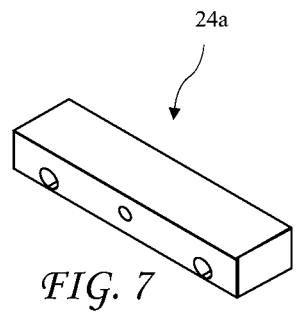
FIG. 7 is a perspective view of a block suitable for sliding cooperation with the two gang adjustable ring according to the present invention.

A perspective view of a two gang adjustable ring 21a according to the present invention is shown in FIG. 6A and a rear view of the two gang adjustable ring 21a is shown in FIG. 6B. Rectangular pockets 30a reside at the top and bottom of the two gang adjustable ring 21a. The two gang adjustable ring 21a includes two adjusting screw passages 33, one in the top and in the bottom passing into each pocket 30a for passage of the adjusting screws 26, and two electrical device mounting passages 32, two at the top and two at the bottom. A two device passage 31a through the center of the two gang adjustable ring 21a is provided for two electrical devices 29 (see FIG. 4D).

Figure 8B:
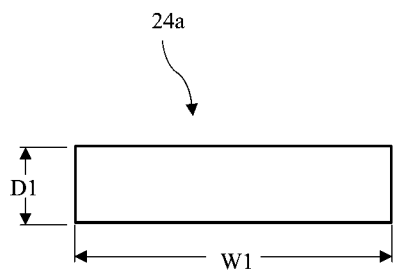
FIG. 8B is a top view of the block suitable for sliding cooperation with the two gang adjustable ring according to the present invention.
Figure 8A:
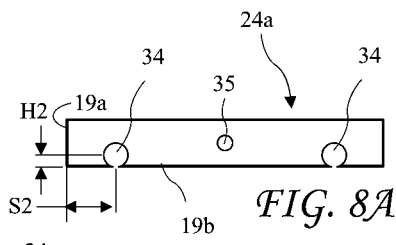
FIG. 8A is a side view of the block suitable for sliding cooperation with the two gang adjustable ring according to the present invention.
Figure 8D:
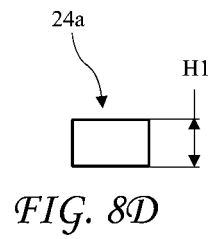
FIG. 8D is an end view of the block suitable for sliding cooperation with the two gang adjustable ring according to the present invention.
Figure 8C:
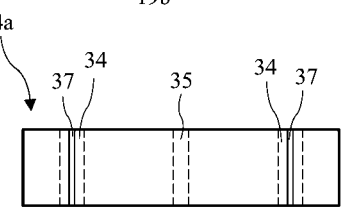
FIG. 8C is a bottom view of the block suitable for sliding cooperation with the two gang adjustable ring according to the present invention.

A perspective view of a block 24a suitable for sliding cooperation with the two gang adjustable ring 21a according to the present invention is shown in FIG. 5, a rear view of the block 24a is shown in FIG. 6, a top view of the block 24a is shown in FIG. 8B, a bottom view of the block 24a is shown in FIG. 8C, and an and view of the block 24a is shown in FIG. 8D. The block 24a is sandwiched between the two gang adjustable ring 21a and the fixed ring 22, residing inside the pockets 30a. The adjusting screws 26 threadably cooperate with the blocks 24a to advance and retreat the block 24a out of and into the pockets 30a when the screws 26 are turned. The block 24a includes a centered threaded passage 35 for receiving the screws 26, and two unthreaded passages 34 for allowing passage of passage the electrical device mounting screws 27.

The block 24a has a width W1 of preferably about 2.615 inches, a depth D1 of preferably about 0.64 inches, and height H1 of preferably about 0.395 inches. The height H1 and length L1 are preferably selected to allow the block 24a to slide in the pocket 30a without binding and without twisting. The unthreaded passages 34 are preferably spaced in about 0.408 inches from the side 19a of the block 24 and are centered a height H2 of preferably about 0.09 inches above the base 19b of the block 24a.

Figure 9:
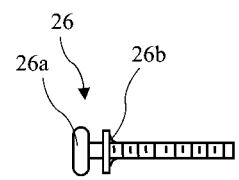
FIG. 9 is a side view of an adjusting screw according to the present invention.

A side view of the adjusting screw 26 according to the present invention is shown in FIG. 9. The screw 26 includes a head 26a and a stop 26b. The face of the two gang adjustable ring 21a is sandwiched between the head 26a and the stop 26b so that the screws 26 neither advances nor retreats with respect to the adjustable ring 21a, and are free to rotate with respect to the adjustable ring 21a. The stop 26b may be part of the screw 26, or may be a clip slid over the screw after passing the screw 26 through the face of the two gang adjustable ring 21a. The adjusting screw passages allowing the stop to pass through the larger openings of the keyed passages and then slid sideways to align with threaded passages 34 in the blocks 24a.

Figure 10A:
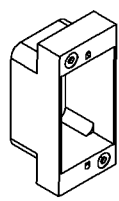
FIG. 10A is a first perspective view of a one gang adjustable ring according to the present invention.
Figure 10B:
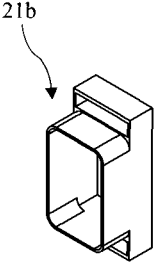
FIG. 10B is a second perspective view of the one gang adjustable ring according to the present invention.
Figure 11B:
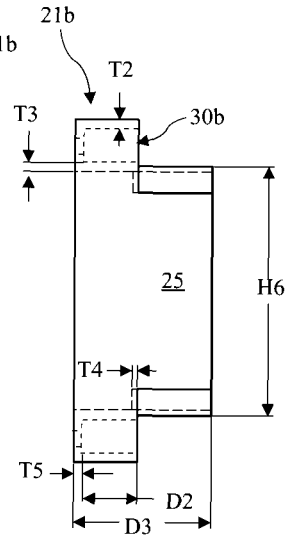
FIG. 11B is a side view of the one gang adjustable ring according to the present invention.
Figure 11C:
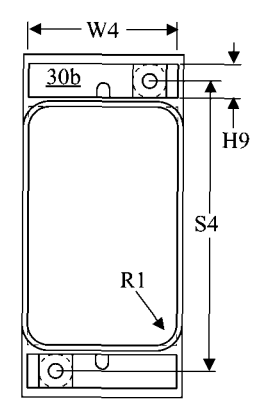
FIG. 11C is a rear view of the one gang adjustable ring according to the present invention.

A first perspective view of a one gang adjustable ring 21b according to the present invention is shown in FIG. 10A, a second perspective view of the one gang adjustable ring 21b is shown in FIG. 10B, a front view of the one gang adjustable ring 21b is shown in FIG. 11A, side view of the one gang adjustable ring 21b is shown in FIG. 11B, a rear view of the one gang adjustable ring 21b is shown in FIG. 11C, and a top view of the one gang adjustable ring 21b is shown in FIG. 11D. The one gang adjustable ring 21b is configured for a single electrical device, the passages 33 are in opposite corners, and two passages 32 are centered above and below a single device passage 31b. The one gang adjustable ring 21b includes a pocket 30b narrower than the pocket 30a and receives a corresponding block 24b narrower that the block 24a. The one gang adjustable ring 21b is otherwise similar to the two gang adjustable ring 21a.

The one gang adjustable ring 21b has an overall height H4 of preferably about 4.07 inches, an overall width W2 of preferably about 1.9 inches, and a side wall thickness T of preferably about 0.065 inches. The device passage 31b has a height H5 of preferably about 2.83 inches and a width W3 of preferably about 1.77 inches and the passage 33 is preferably spaced in from the side a spacing S3 of about 0.40 inches and is preferably about vertically centered in the pocket 30b. The throat 25 has a height H6 of preferably 2.96 inches.

The pockets 30b have a W4 of preferably about 1.77 inches, a height H9 of preferably about 0.40 inches, and a depth D2 of preferably about 0.65 inches. The material on the closed end of the pocket 30b has a thickness T5 of preferably about 0.10 inches. Centers of the pockets 30b are preferably separated vertically by a separation S4 of preferably about 3.45 inches.

Figure 12:
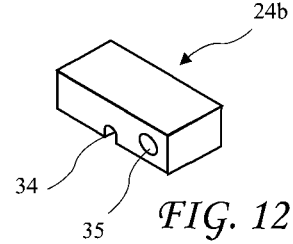
FIG. 12 shows a second block according to the present invention for use with the one gang adjustable ring.

The second block 24b for use with the one gang adjustable ring 21b is shown in FIG. 12. The second block 24b slides in the pocket 30b and includes the threaded passage 35 and the unthreaded passage 34 aligned with the passage 32 and 33 in the one gang adjustable ring 21b.

The adjustable box extender has been described for one and two gang adjustable box extender, but is equally applicable to three gang, four gang, or larger adjustable box extender, and also applicable to round, oval, and other shapes of adjustable box extenders, and an adjustable box extender for any number of gangs and any shape is intended to come within the scope of the present invention. Additionally, the fixed ring 22 may the rectangular, square, round, oval or any other shape, and may be flat or curved to special applications, and any an adjustable box extender according to the present invention used with any shape or curved plaster ring is intended to come within the scope of the present invention. Further, the fixed ring is not limited to steel and may be made of any suitable material.

While the invention herein disclosed has been described by means of specific embodiments and applications thereof, numerous modifications and variations could be made thereto by those skilled in the art without departing from the scope of the invention set forth in the claims.

We claim:

1. An adjustable box extender comprising:
    a fixed ring having a ring mouth and attachable to an electrical box;
    an adjustable ring comprising:
        a face for mounting electrical devices;
        a throat opposite the face and slidable into the ring mouth of the fixed ring;
        a device passage through the adjustable ring allowing an electrical device to be inserted into the adjustable ring; and
        rear opening rectangular pockets residing above and below the device passage;
    adjusting screws pass through the pockets and are held by the adjustable ring with the screw head exposed on the face of the adjustable ring, neither advancing nor retreating with respect to the adjustable ring, and free to rotate with respect to the adjustable ring; and
    rectangular blocks slidable into and out of the pockets and between the adjustable ring and the fixed ring and having threads in the blocks threadably engagable by the adjusting screws and advance and retreat the block out of and into the pockets when the screws are turned, thereby extending the adjustable ring away from the fixed ring to adjust for dry wall thickness.

2. The adjustable box extender of claim 1, further including:
    threaded passages through the fixed ring spaced vertically apart to match the spacing of mounting screws for the electrical device; and
    unthreaded passages through the adjustable ring aligned with threaded passages through the fixed ring.

3. The adjustable box extender of claim 2, further including an electrical device attached to the fixed plate by the mounting screws, the adjustable plate sandwiched between the electrical device and the fixed plate.

4. The adjustable box extender of claim 1, wherein the device passage in the adjustable ring has a width configured to accept two side by side electrical devices.

5. The adjustable box extender of claim 1, wherein the device passage in the adjustable ring has a width configured to accept one electrical device.

6. The adjustable box extender of claim 5, wherein the fixed ring is a flat steel plate.

7. The adjustable box extender of claim 1, wherein the fixed ring is a flat plate.

8. The adjustable box extender of claim 1, wherein the adjustable ring is made from plastic.

9. The adjustable box extender of claim 1, wherein the blocks are about 0.64 inches deep.

10. The adjustable box extender of claim 1, wherein the pockets are about 0.65 inches deep.

11. The adjustable box extender of claim 1, wherein the adjusting screws include fixed washers spaced apart from screw heads.

12. An adjustable box extender comprising:
    a fixed ring attachable to an electrical box, the fixed ring including:
        a ring mouth; and
        threaded passaged above and below the mouth vertically spaced apart to receive electrical device screws;
    an adjustable ring comprising:
        a face for mounting electrical devices;
        a throat opposite the face and slidable into the ring mouth of the fixed ring;
        a device passage through the adjustable ring allowing an electrical device to be inserted into the adjustable ring;
        rear opening pockets residing above and below the device passage; and
        unthreaded passages through the adjustable ring aligned with threaded passages through the fixed ring, the unthreaded passages spaced vertically apart to match the spacing of the mounting screws for the electrical device;
    adjusting screws pass through the pockets and are held by the adjustable ring with the screw head exposed on the face of the adjustable ring, neither advancing nor retreating with respect to the adjustable ring, and free to rotate with respect to the adjustable ring; and
    blocks slidable into and out of the pockets and between the adjustable ring and the fixed ring and having threads in the blocks threadably engagable by the adjusting screws and advance and retreat the block out of and into the pockets when the screws are turned, thereby extending the adjustable ring away from the fixed ring to adjust for dry wall thickness.

13. An adjustable box extender comprising:
    a fixed ring attachable to an electrical box, the fixed ring including:
        a ring mouth; and
        threaded passaged above and below the mouth vertically spaced apart to receive electrical device screws;

an adjustable ring comprising:
  a face for mounting electrical devices;
  a throat opposite the face and slidable into the ring mouth of the fixed ring;
  a device passage through the adjustable ring allowing an electrical device to be inserted into the adjustable ring;
  rear opening pockets residing above and below the device passage; and
  unthreaded passages through the adjustable ring aligned with threaded passages through the fixed ring, the unthreaded passages spaced vertically apart to match the spacing of the mounting screws for the electrical device;
adjusting screws pass through the pockets and are held by the adjustable ring with the screw head exposed on the face of the adjustable ring, neither advancing nor retreating with respect to the adjustable ring, and free to rotate with respect to the adjustable ring; and
blocks slidable into and out of the pockets and between the adjustable ring and the fixed ring and having threads in the blocks threadably engagable by the adjusting screws and advance and retreat the block out of and into the pockets when the screws are turned, thereby extending the adjustable ring away from the fixed ring to adjust for dry wall thickness; and
an electrical device attached to the fixed plate by the mounting screws, the adjustable plate sandwiched between the electrical device and the fixed plate.

* * * * *